United States Patent [19]
Larraburu

[11] 3,818,216
[45] June 18, 1974

[54] MANUALLY OPERATED LAMPHOUSE

[76] Inventor: Philippe M. Larraburu, 12005 Albers, North Hollywood, Calif. 91607

[22] Filed: Mar. 14, 1973

[21] Appl. No.: 341,155

[52] U.S. Cl........... 240/41.3, 240/46.03, 240/46.59, 355/35, 355/71, 355/88
[51] Int. Cl. ........................................ F21v 13/04
[58] Field of Search............ 240/41.3, 46.03, 46.01, 240/46.59, 41 R, 3.1; 350/314, 311; 355/35, 36, 38, 67, 71, 88

[56] References Cited
UNITED STATES PATENTS

| | | | |
|---|---|---|---|
| 3,085,468 | 4/1963 | Hehn | 355/35 |
| 3,260,152 | 7/1966 | Aston | 350/314 |
| 3,395,611 | 8/1968 | Atkinson | 355/38 |
| 3,458,256 | 7/1969 | Stemke | 355/88 |
| 3,502,409 | 3/1970 | Balint et al. | 355/36 |

Primary Examiner—Richard L. Moses
Attorney, Agent, or Firm—Pastoriza & Kelly

[57] ABSTRACT

A manually operated lamphouse for providing light color control and intensity for improving, the quality of negative films in printing, for example, includes a broad spectrum tungsten lamp the intensity of which is manually controllable. Dichroic mirrors are utilized to separate the broad spectrum of the lamp into first, second, and third colors. Individual attenuation controls in turn operable from the exterior of the lamp housing enable the intensity of the individual colors to be controlled. The colors are then recombined and passed out a projection axis through a lenticular lens system to integrate the recombined beam to provide a uniform output beam. The color content and intensity of the output beam can thus be manually controlled in accord with various operations to be performed such as the printing of film.

5 Claims, 4 Drawing Figures

PATENTED JUN 18 1974  3,818,216

MANUALLY OPERATED LAMPHOUSE

This invention relates generally to light projectors and more particularly to a manually operated lamphouse particularly useful for enhancing photographic prints.

BACKGROUND OF THE INVENTION

In printing films such as motion picture films, there are two types of existing lamphouses. A first type uses a series of different types of filters such as gelatin filters referred to as Wratten type in front of a light source. Essentially, spectral portions of the light are subtracted from the white light to provide a desired color control. However, these filters can only control the light in steps and further tend to fade with time. A second type utilizes electro-mechanical additive lamphouses utilizing modulating members defining a variable width slit to vary the amount of color from each lamphouse. Again however, the light intensity can only be varied in steps. Moreover, the additive type lamphouses are bulky and cannot be mounted on a moving member.

BRIEF DESCRIPTION OF THE PRESENT INVENTION

The present invention provides a manually operated lamphouse which is relatively compact in size and relatively inexpensive as compared to presently available lamphouses and which, most importantly, provides a vastly improved output light beam wherein the intensity and color content can be very simply manually controlled in a continuous as opposed to stepwise fashion.

In accord with the invention, there is provided a broad spectrum light source with a manually operable light source intensity control means connected to the source. Further means are provided for separating the broad spectrum of the light source into first, second, and third spectral portions corresponding to first, second, and third colors which when recombined form substantially white light. Manually controllable first, second, and third attenuation control means are provided for individually varying the intensity of the first, second and third spectral portions. Finally, an integrating means receives and recombines the first, second, and third portions to provide an output light beam in which the overall intensity and relative color content are determined by the manual setting of the manually operable light source intensity control means and the individual settings of the first, second, and third attenuation control means.

Since the lamphousing is manually operated with very simply controls, it may be housed in a compact packaging and readily mounted directly to a printing camera head.

BRIEF DESCRIPTION OF THE DRAWINGS

A better understanding of the invention will be had by referring to a preferred embodiment thereof as illustrated in the accompanying drawings, in which.

DETAILED DESCRIPTION OF THE PREFERRED EMBODIMENT

Figure 1:
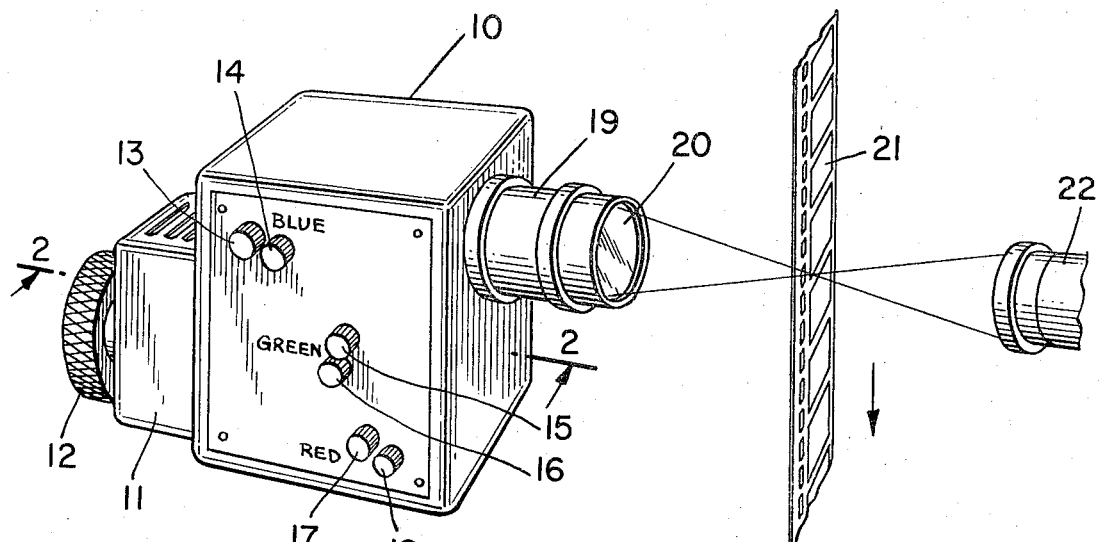
FIG. 1 is a perspective view of a manually operated lamphouse in accord with the invention showing in diagrammatic form the manner in which the light is used in printing a negative film.

Referring first to FIG. 1 there is shown a housing 10 including a lamphousing portion 11 for housing a tungsten filament lamp the intensity of which may be manually controlled as by a suitable variac. For this purpose, there is illustrated a knob 12 for varying the voltage supply to the lamp and thus controlling its intensity.

Within the housing portion 10 there is provided a means for separating the broad spectrum of the light source into first, second, and third spectral portions corresponding to first, second, and third colors which when recombined form substantially white light. By way of example, the three colors are blue, green, and red respectively. Also included within the housing portion 10 are first, second, and third attentuation control means for individually varying the intensity of the first, second, and third spectral portions of the light. These attenuation control means are manually operable as by the provision of first, second, and third pairs of exterior knobs 13, 14; 15, 16; and 17, 18.

The assembly is completed by an integrating means including a lenticular lens arrangement 19 cooperating with a front projection lens 20. The output beam from the lens 20 serves to illuminate a negative film 21 with a controlled light wherein the color content and intensity can be manually varied as desired by manual rotation of the various knobs described. A lens 22 on the other side of the film 21 serves to pick up the image on a negative duplicating film to be printed.

The present invention is concerned with the manually operated lamphouse and not with the particular purpose of which the output beam is utilized. Essentially, the principal object is to provide an output light wherein the relative color content and intensity can be carefully and finely controlled manually.

Figure 2:
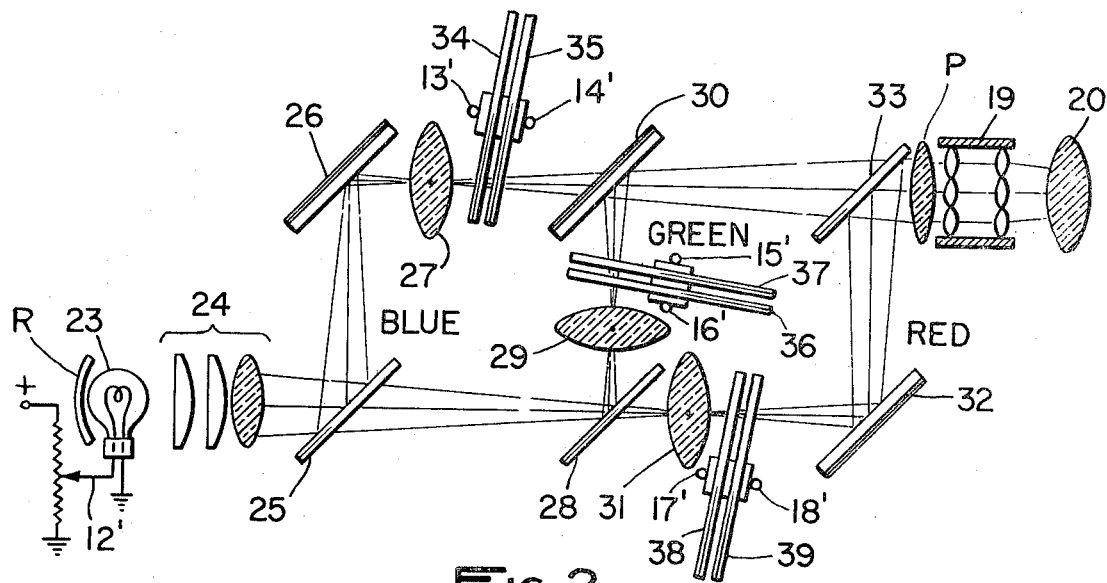
FIG. 2 is a diagrammatic form showing relative positions of internal components in the lamphousing of FIG. 1 taken generally in the direction of the arrows 2—2.

Referring now to FIG. 2, the components within the housing portion 10 for separating the broad spectrum of light into the three spectral portions, effecting the individual attenuation, and integrating the portions to provide the final output beam will be described. Referring first to the lower left portion of FIG. 2, there is shown a tungsten filament lamp 23 cooperating with a voltage dividing tap 12' manually operable by the knob 12 of FIG. 1 so that the intensity of the tungsten filament lamp 23 can be varied. The use of a tungsten filament provides a broad spectrum light source. A condensing lens system 24 is disposed in front of the lamp 23 and a light beam from the lamp is passed along a first given path within the housing with the aid of rear reflector R.

The means for separating the broad spectrum of the light source into first, second, and third spectral portions includes a first dichroic mirror 25 positioned in the given light path to intercept the light at 45° and direct out from the path at 90° the first spectral portion corresponding to the first color; for example, blue. This first spectral portion is intercepted by a first totally reflecting mirror 26 and directed through a projection lens 27 along a projection axis running generally parallel to the initial given path. The remaining second and third spectral portions pass through the dichroic mirror 25 along the given path. A second dichroic mirror 28 is positioned on the path to intercept the second and third spectral portions at 45° and direct out from the path at 90° the second spectral portion corresponding to the second color; for example, green. This second spectral portion passes through a projection lens 29 to a first half reflecting and half transmitting mirror 30 positioned at 45° so as to direct the second portion along the projection axis, this portion recombining with the first spectral portion passing through the lens 27.

The finally remaining third spectral portion passing directly through the dichroic mirror 28 along the path passes through a projection lens 31 to a second totally reflecting mirror 32 disposed at 45° to direct the third spectral portion upwardly in a direction parallel to the second spectral portion. This third spectral portion is intercepted by a second half reflecting and half transmitting mirror 33 disposed at 45° on the projection axis so that the third spectral portion is recombined with the first and second spectral portions.

The spectral separation is effected essentially by the dichroic mirrors while the recombining is effected by the totally reflecting mirrors and half reflecting and half transmitting mirrors, these elements constituting part of an overall integrating means. This integrating means is completed by the provision of the lenticular lenses 19. Essentially, the lenticular lenses are positioned on the projection axis for providing multiple projected images of the lamp filament to an image plane which images all overlap to provide the desired output light beam passing through the projection lens 20.

The lens 24 images the lamp filament in the lens 27, 29 and 31. The diverging rays from these lenses in turn image the uniformly illuminated lens 24 onto a lens P which renders the light rays passing to the lenticular lens portion of the integrating means parallel.

The assembly is completed by the provision of first, second, and third attenuating control means in the form of first, second, and third pairs of counter-rotatable optical wedges positioned to intercept the first, second, and third spectral portions respectively. Thus, there is shown in the upper portion of FIG. 2 optical wedges 34 and 35 coaxially aligned and arranged to be manually rotated in opposite directions as by shafts indicated at 13' and 14'. These shafts are coupled to the knobs 13 and 14 of FIG. 1. It will be noted that the rotational axis of the optical wedges is disposed at a small angle, for example, 5°, to the projection axis along which the first spectral portion from the totally reflecting mirror 26 passes. By so angulating the wedges, multiple reflections in the optical path are avoided.

The second attenuation control means similarly takes the form of counter-rotatable optical wedges 36 and 37 positioned to intercept the second spectral portion of light from the dichroic mirror 28. Finally, the third attenuation control means includes optical wedges 38 and 39 positioned to intercept the remaining third spectral portion of light from the dichroic mirror 28. The second and third pairs 36, 37 and 38, 39 of counter-rotating wedges similarly have their rotational axes disposed at small angles to the path of the spectral portions passing therethrough.

Also as in the case of the first pair, the second and third pair include shafts 15', 16' and 17', 18' connecting to the external knobs of FIG. 1 shown at 15, 16 and 17, 18.

Figure 3:
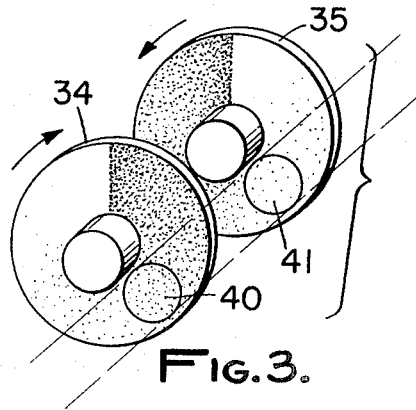
FIG. 3 is an exploded perspective view of one of the attenuation control means utilized in FIG. 2; and, FIG. 4 is a diagrammatic showing of a portion of the light integrating means of FIG. 2.

FIG. 3 illustrates in greater detail the counterrotating optical wedges 34 and 35. The second and third pairs of wedges are identical in construction and therefore a detailed description of the wedges 34 and 35 will suffice for both.

As shown in FIG. 3, each of the wedges has a darkened high density portion which gradually becomes more transparent in a circumferential direction. By turning one of the wedges around so that its rate of increasing transparency is in an opposite circumferential direction to that of the other, and placing the wedges close to each other in coaxial relationship, light passing through both wedges will be attenuated in a uniform manner over its cross section. For example, the light passing through the circular area 40 for the optical wedge 34 is more attenuated at the upper portion of the circular area than at the lower portion. On the other hand, when this emerging light beam passes through the second optical wedge 35 through the circular area 41, the lower portion is attenuated more than the upper portions so that the resulting output is fairly uniform. When both wedges are rotated in counter directions as indicated by the arrows, the output beam will become progressively more attenuated. Rotation of the two wedges in opposite directions will result in the output beam becoming less attenuated. Either one of the wedges can be rotated individually to provide a finer adjustment of the attenuation by simply rotating one of the connecting knobs as described in conjunction with FIG. 1.

In an actual embodiment, there may be provided circular scales for the various knobs so that resetting of the attenuation control to consistent settings can be accomplished.

Figure 4:
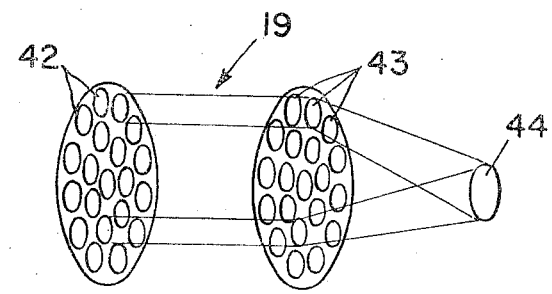

Referring now to FIG. 4, the lenticular lens 19 of FIG. 2 will be described in greater detail. As shown, this lens includes a first multiple lens frame supporting multiple lenses 42 and a second multiple lens frame supporting multiple lenses 43 corresponding in number and axially aligned with the lenses 42. However, the inclination of the lenses is such that each corresponding pair in the frames 42 and 43 will project an image to a consistent location or plane as indicated by the circle 44 corresponding to the focal plane of lens 20. Thus various portions of the cross sectional area of the beam passing into the lenticular lens will be picked up and projected onto an overlapping relationship at the circle 44 thereby providing for great uniformity of the output beam.

OPERATION

The operation of the manually operated lamphouse will be evident from the foregoing description. When the tungsten lamp is illuminated, the broad spectrum of light along the first given path as described in FIG. 2 will be divided into first, second, and third spectral portions corresponding to the colors blue, green, and red. The intensity of each of these portions can be individually controlled by the counter-rotatable optical wedges. Thus, if a large quantity of blue is desired in the output beam and lesser quantities of green and red, the degree of attenuation of the respective portions can be correspondingly adjusted. After appropriate settings have been made, the beam is recombined by the various mirrors and rendered substantially uniform by the lenticular lens portion of the integrating system. The overall intensity of the final output beam, of course, can be controlled by controlling the intensity of the tungsten lamp 23 as by the veriac control 12.

Normally, this intensity will be adjusted before the other adjustments are made. That is, once a given voltage setting is made, it is left at that valve since the relative color content changes for different voltages.

From the foregoing, it will thus be evident that the present invention has provided a very simple and compact manually operated lamphouse wherein both the color content and overall intensity of an output light beam is readily controlled and can be consistently reset to provide desired qualities. Further, it will be evident that adjustments are continuous in nature rather than stepwise so that very enhanced effects as desired can be realized.

While a specific embodiment of the invention has been shown and illustrated, it will be understood by those skilled in the art that various changes can be effected without departing from the scope and spirit of the invention. For example, the mirrors 26 and 32 could be dichroic mirrors rather than normal totally reflecting mirrors to further reduce the unselected spectral portions. Also, the lenticular lens could be rectangular to form a rectangular area at the plane 44.

What is claimed is:

1. A manually operated lamphouse for providing light color control and intensity comprising, in combination:
   a. a broad spectrum light source;
   b. manually operable light source intensity control means connected to said light source;
   c. means for separating the broad spectrum of said light source into first, second, and third spectral portions corresponding to first, second, and third colors which when recombined form substantially white light, said means including,
      a first dichroic mirror positioned on said given path to intercept said light at 45° and direct out from the path at 90° the first spectral portion corresponding to the first color and pass the second and third spectral portions along the given path; and,
      a second dichroic mirror positioned on said given path to intercept said second and third spectral portions at 45° and direct out from the path at 90° said second spectral portion corresponding to said second color and pass the third spectral portion corresponding to the third color along the path;
   d. manually controllable first, second, and third attenuating control means for individually varying the intensity of said first, second, and third spectral portions including first, second, and third pairs of counter-rotatable optical wedges positioned to intercept said first, second, and third spectral portions respectively; and
   e. integrating means receiving and recombining said first, second, and third portions to provide an output light beam in which the overall intensity and relative color content are determined by the manual setting of said manually operable light source intensity control means and the individual settings of the first, second, and third attenuation control means said integrating means including: optical means intercepting the first, second, and third spectral portions and re-collimating them along a projection axis, and lenticular lens means positioned on said projection axis for providing multiple projected images of the lamp filament in an image plane which images all overlap to provide said output light beam.

2. A lamphouse according to claim 1, in which said optical means includes two totally reflecting mirrors positioned at 45° to said given path to intercept said first spectral portion and direct it along said projection axis and intercept said third spectral portion at 45° and direct it in a direction parallel to said second spectral portion; and two half reflecting and half transmitting mirrors positioned on said projection axis at 45° to intercept respectively said second and third spectral portions and direct them along said projection axis, said first spectral portion from said first totally reflecting mirror recombining with said second spectral portion at said first half reflecting and half transmitting mirror, and said first and second spectral portions recombining with said third spectral portion from said second totally reflecting mirror at said second half reflecting and half transmitting mirror so that all three spectral portions pass out along said projection axis to said integrating means.

3. A lamphouse according to claim 2, including first, second, and third projection lenses positioned respectively to intercept said first, second, and third spectral portions and image the same in a common plane on said projection axis for projection by said lenticular lens means.

4. A lamphouse according to claim 3, including a housing for said light source, means for separating the broad spectrum of said light source, and manually controllable first, second, and third attenuation control means, said housing including exterior knobs for manual rotation coupled to the first, second, and third attenuation control means.

5. A lamphouse according to claim 2, in which said pairs of counter-rotatable optical wedges are positioned with their axes at a slight angle to the optical path to avoid multiple reflections and wherein the optical wedge of each pair has a varying density in a circumferential direction, the two wedges making up the pairs being oppositely oriented so that the circumferential directions of increasing density are opposite to each other so that attenuation of a spectral portion passing through the counter-rotatable wedges remains substantially uniform over the cross sectional area of the spectral portion.

* * * * *